United States Patent
O'Neill et al.

(10) Patent No.: US 9,195,820 B2
(45) Date of Patent: Nov. 24, 2015

(54) SYSTEM AND METHOD FOR GRADUATED SECURITY IN USER AUTHENTICATION

(71) Applicant: MasterCard International Incorporated, Purchase, NY (US)

(72) Inventors: John D. O'Neill, Darien, CT (US); Eric Alger, Edwardsville, IL (US); Scott W. Anderson, Jr., Wentzville, MO (US); Joshua J. Baron, Wildwood, MO (US); Matthew R. Cahalin, O'Fallon, MO (US); Ryan T. Dunn, St. Peters, MO (US); Richard D. d'Erizans, Pleasantville, NY (US); Gregg A. Hill, Lake Saint Louis, MO (US); Matthew E. Hopkins, St. Peters, MO (US); Justin T. Katen, Foristell, MO (US); Cynthia E. Pilling, Wildwood, MO (US); James B. Schelker, Chesterfield, MO (US); Prashant Sharma, Ballwin, MO (US); Jenny Q. Zhang, Wildwood, MO (US)

(73) Assignee: MasterCard International Incorporated, Purchase, NY (US)

( * ) Notice: Subject to any disclaimer, the term of this patent is extended or adjusted under 35 U.S.C. 154(b) by 20 days.

(21) Appl. No.: 13/969,684

(22) Filed: Aug. 19, 2013

(65) Prior Publication Data

US 2015/0052587 A1 Feb. 19, 2015

(51) Int. Cl.
*G06F 7/04* (2006.01)
*G06F 15/16* (2006.01)
(Continued)

(52) U.S. Cl.
CPC .............. *G06F 21/33* (2013.01); *H04L 63/105* (2013.01); *G06F 21/31* (2013.01); *G06F 21/41* (2013.01); *G06F 2221/2113* (2013.01); *H04L 63/0815* (2013.01)

(58) Field of Classification Search
CPC . G06F 2221/2113; G06F 21/33; G06F 21/31; G06F 21/41; H04L 63/0815; H04L 63/105
USPC ............................................................ 726/4
See application file for complete search history.

(56) References Cited

U.S. PATENT DOCUMENTS

| 8,364,806 B2 | 1/2013 | Short et al. |
| 8,370,477 B2 | 2/2013 | Short et al. |

(Continued)

FOREIGN PATENT DOCUMENTS

| KR | 10-2007-0021999 A | 2/2007 |
| KR | 10-2013-0005950 A | 1/2013 |
| WO | 2005071925 A2 | 8/2005 |

OTHER PUBLICATIONS

International Search Report and Written Opinion issued in International Application No. PCT/US2014/049637 mailed Dec. 1, 2014.

*Primary Examiner* — David García Cervetti
*Assistant Examiner* — Amie C Lin
(74) *Attorney, Agent, or Firm* — Armstrong Teasdale LLP

(57) ABSTRACT

A computer system for authenticating user access to at least one computer application of a plurality of computer applications is provided. The computer system includes a memory device and a processor. The computer system is programmed to identify a security level from a plurality of security levels for each computer application within the plurality of computer applications. The plurality of security levels include at least a first-tier security level and a second-tier security level. The second-tier security level requires additional authentication information as compared to the first-tier security level. The computer system is also programmed to create a user account for a user within the memory device with the first-tier security level, and to determine that the user account requires the second-tier security level, and prompt the user to enter the additional authentication information. The computer system is also programmed to promote the user account to the second-tier security level.

27 Claims, 8 Drawing Sheets

(51) Int. Cl.
    *G06F 17/30*     (2006.01)
    *H04L 29/06*     (2006.01)
    *G06F 21/33*     (2013.01)
    *G06F 21/41*     (2013.01)
    *G06F 21/31*     (2013.01)

(56) References Cited

U.S. PATENT DOCUMENTS

| | | |
|---|---|---|
| 8,392,420 B2 | 3/2013 | Mellmer et al. |
| 2001/0034717 A1 | 10/2001 | Whitworth |
| 2002/0026575 A1 | 2/2002 | Wheeler et al. |
| 2002/0129248 A1 | 9/2002 | Wheeler et al. |
| 2005/0044423 A1 | 2/2005 | Mellmer et al. |
| 2006/0070114 A1* | 3/2006 | Wood et al. ............. 726/2 |
| 2007/0204016 A1* | 8/2007 | Kunz et al. ............. 709/223 |
| 2009/0055910 A1* | 2/2009 | Lee ............. 726/6 |
| 2010/0332336 A9 | 12/2010 | Quigley |
| 2011/0022425 A1 | 1/2011 | Block et al. |
| 2013/0091042 A1 | 4/2013 | Shah et al. |
| 2014/0068733 A1* | 3/2014 | Belisario et al. ............. 726/6 |

* cited by examiner

SYSTEM AND METHOD FOR GRADUATED SECURITY IN USER AUTHENTICATION

BACKGROUND OF THE DISCLOSURE

This disclosure relates generally to secure access to web applications and, more particularly, to systems and methods for graduated security for web applications implementing user accounts.

Businesses with significant Internet presence may have a suite of customer-accessible web content and web applications. Some content, such as static web pages, are accessible to customers anonymously (i.e., without the customer having to provide any identifying information). Other content, however, may be customized based on the particular user. This customized content may only be accessed by a user after the user identifies themselves to the content provider. In order to uniquely identify individual users, some identifying information is required. However, some users may be reluctant to provide certain information, such as creating a user account and password.

Some known web applications do not require much identifying information. For example, a financial organization may provide an "offers" program, where a customer or potential customer can sign up to get alerts on special service offerings. Such an application may only require a way to contact the customer, such as an email address or a cellphone number. Another application, for example, may allow the customer to view transactional information associated with that customer's payment cards. Such an application may require greater authentication, such as the creation of a user name and a password. And still another application may allow the customer to access their payment card number, such as through an "online wallet." Such an application may require even greater authentication, such as providing and answering security questions.

Some known suites of applications utilize user authentication. However, each application may have their own separate authentication requirements, or they may all share the same level of authentication, such as a single ID and password. A system and method for graduated security in authenticating a user accessing online data is needed.

BRIEF DESCRIPTION OF THE DISCLOSURE

In one aspect, a computer system for authenticating user access to at least one computer application of a plurality of computer applications is provided. The computer system includes a memory device and a processor. The computer system is programmed to identify a security level from a plurality of security levels for each computer application within the plurality of computer applications. The plurality of security levels include at least a first-tier security level and a second-tier security level. The second-tier security level requires additional authentication information as compared to the first-tier security level. The computer system is also programmed to create a user account for a user within the memory device. Creating the user account includes configuring the user account with the first-tier security level. The computer system is further programmed to determine that the user account requires the second-tier security level. The computer system is also programmed to prompt the user to enter the additional authentication information. The computer system is further programmed to promote the user account to the second-tier security level.

In another aspect, a computer-implemented method for tiered authentication of users is provided. The method uses a computer device in communication with an authentication tool and a plurality of computer applications. The authentication tool performs authentication for the plurality of computer applications. The method includes defining a security level from a plurality of security levels for each computer application of the plurality of computer applications. The plurality of security levels include at least a first-tier security level and a second-tier security level. The second-tier security level requires additional authentication information as compared to the first-tier security level. The method also includes creating a user account for a user within the authentication tool. Creating the user account includes configuring the user account as the first-tier security level. The method further includes determining that the user account requires second-tier security level. The method also includes prompting the user to enter the additional authentication information. The method further includes promoting the user account to the second-tier security level.

In yet another aspect, at least one non-transitory computer-readable storage media having computer-executable instructions embodied thereon is provided. When executed by at least one processor, the computer-executable instructions cause a processor to identify a security level from a plurality of security levels for each computer application within a plurality of computer applications. The plurality of security levels include at least a first-tier security level and a second-tier security level. The second-tier security level requires additional authentication information as compared to the first-tier security level. The computer-executable instructions also cause the processor to create a user account for a user within a memory device communicatively coupled with the processor. Creating the user account includes configuring the user account as the first-tier security level. The computer-executable instructions further cause the processor to determine that the user account requires the second-tier security level. The computer-executable instructions also cause the processor to prompt the user to enter the additional authentication information. The computer-executable instructions further cause the processor to promote the user account to the second-tier security level.

In yet another aspect, a computer system for authenticating user access to a computer application including a plurality of modules. The computer system includes a memory device and a processor. The computer system is programmed to identify a security level from a plurality of security levels for one or more modules of the plurality of modules. The plurality of security levels include at least a first-tier security level and a second-tier security level. The second-tier security level requires additional authentication information as compared to the first-tier security level. The computer system is also programmed to create a user account for a user within the memory device. Creating the user account includes configuring the user account with the first-tier security level. The computer system is further programmed to determine that the user account requires the second-tier security level. The computer system is also programmed to prompt the user to enter the additional authentication information. The computer system is further programmed to promote the user account to the second-tier security level.

BRIEF DESCRIPTION OF THE DRAWINGS

FIG. 1 is a schematic diagram illustrating an example multi-party payment card industry system for enabling ordinary payment-by-card transactions in which merchants and card issuers do not necessarily have a one-to-one relationship.

FIG. 2 is a simplified block diagram of an example user authentication system including a plurality of computer devices in accordance with one example embodiment of the present disclosure.

FIG. 3 is an expanded block diagram of an example embodiment of a server architecture of the user authentication system including the plurality of computer devices in accordance with one example embodiment of the present disclosure.

FIG. 4 illustrates an example configuration of a client system shown in FIGS. 2 and 3.

FIG. 5 illustrates an example configuration of a server system shown in FIGS. 2 and 3.

FIG. 6 is a schematic diagram of a suite of applications implementing an example three-tiered user authentication model using the computing systems shown in FIG. 5.

FIG. 7 is an example method of implementing a tiered user authentication model similar to that shown in FIG. 6.

FIG. 8 shows an example configuration of a database within a computing device, along with other related computing components, that may be used during user authentication.

DETAILED DESCRIPTION OF THE DISCLOSURE

Figure 1:
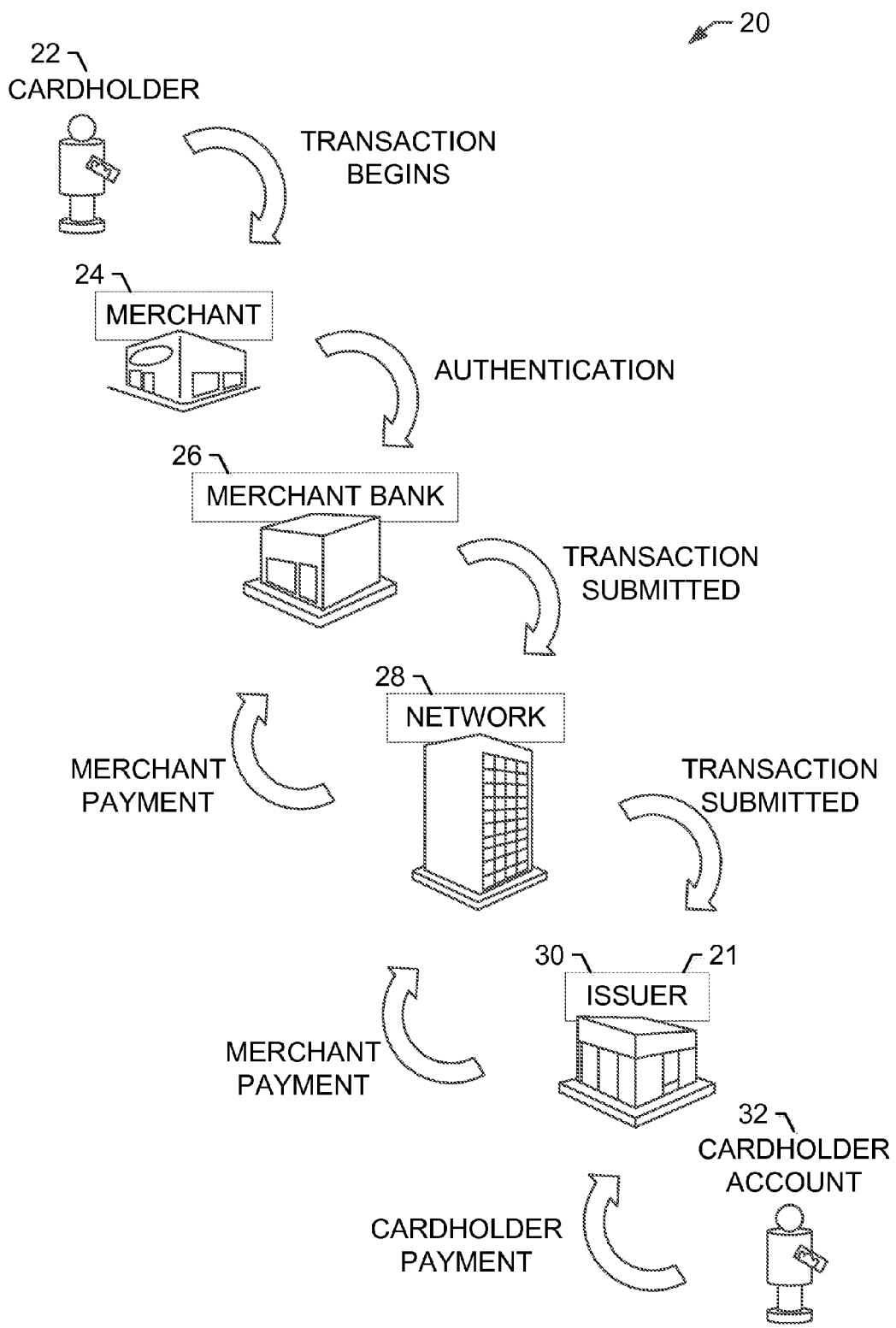
FIGS. 1-8 show example embodiments of the methods and systems described herein.

Embodiments of the present disclosure describe a graduated security model implemented using a user authentication computing system that is in communication with a user-based computer application or suite of applications. The methods and systems described herein facilitate reducing the burden of information disclosure for users of the suite of applications while maintaining required security levels for each application. In one embodiment, each application in a suite of applications is pre-defined as a first-tier security application or a second-tier security application, with first-tier security requiring less authentication data from the user than the second-tier applications. In other words, the first-tier security applications would be at a lower security level than the second-tier security applications.

A user of the application suite creates an account, providing a minimal set of identifying information, such as an email address. The user's account is created as a first-tier account. When a user accesses other first-tier applications, the user's account is already permissioned for first-tier access, and thus the user need not provide any greater information. When the user attempts to access a second-tier application, however, the authentication system determines that the user account is below the required level for the second-tier applications, and thus, the system automatically prompts the user for additional authentication information. The second-tier security level may require greater authentication requirements such as a user name and/or password. When the user provides the requisite information for second-tier access, the user's account is promoted to second-tier access, and thereby allowed access to second-tier applications.

In the example embodiment, the suite of applications may relate to financial and/or payment transactions. Thus, the data being accessed by a user may include financial data, banking data, or other data related to transactions performed by the user. Accordingly, in the example embodiment, the user authentication computing system is configured to determine a user's security level during interaction with the suite of applications, compare the user's security level to the security level of each particular application as the user accesses that application, and prompt the user for further authentication information if the user attempts to access an application of a higher-tier security level than the user's account before allowing the user's account to access deeper financial data associated with the user. Although described herein in the context of access to financial transaction data, such as applications involving a consumer and their payment cards, the present disclosure is not limited to merely uses involving financial data, but rather could be used in any situation in which an application or suite of applications could benefit from a graduated security model with regard to user authentication as described herein.

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein.

Each component and process can also be used in combination with other assembly packages and processes.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transactions card can be used as a method of payment for performing a transaction. In addition, consumer card account behavior can include but is not limited to purchases, management activities (e.g., balance checking), bill payments, achievement of targets (meeting account balance goals, paying bills on time), and/or product registrations (e.g., mobile application downloads).

The systems and processes are not limited to the specific embodiments described herein. In addition, components of each system and each process can be practiced independent and separate from other components and processes described herein. Each component and process also can be used in combination with other assembly packages and processes.

The following detailed description illustrates embodiments of the disclosure by way of example and not by way of limitation. It is contemplated that the disclosure has general application to user authentication for computer applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic diagram illustrating an example multi-party transaction card industry system 20 for enabling ordinary payment-by-card transactions in which merchants 24 and card issuers 30 do not need to have a one-to-one special relationship. Typical financial transaction institutions provide a suite of interactive, online applications to both current and prospective customers. For example, a financial transactions institution may have a set of applications that provide informational and sales information on their products and services to prospective customers, as well as another set of applications that provide account access for existing cardholders. User access to such systems may be controlled and regulated based on the user authentication systems and methods described herein. Such user authentication systems may be built directly into the payment system shown in FIG. 1, or may be configured separately but accessed by the payment system during user authentication activities.

Embodiments described herein may relate to a transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, N.Y.).

In a typical transaction card system, a financial institution called the "issuer" issues a transaction card, such as a credit card, to a consumer or cardholder 22, who uses the transaction card to tender payment for a purchase from a merchant 24. To accept payment with the transaction card, merchant 24 must normally establish an account with a financial institution that is part of the financial payment system. This financial institution is usually called the "merchant bank," the "acquiring bank," or the "acquirer." When cardholder 22 tenders payment for a purchase with a transaction card, merchant 24 requests authorization from a merchant bank 26 for the amount of the purchase. The request may be performed over the telephone, but is usually performed through the use of a point-of-sale terminal, which reads cardholder's 22 account information from a magnetic stripe, a chip, or embossed characters on the transaction card and communicates electronically with the transaction processing computers of merchant bank 26. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 28, computers of merchant bank 26 or merchant processor will communicate with computers of an issuer bank 30 to determine whether cardholder's 22 account 32 is in good standing and whether the purchase is covered by cardholder's 22 available credit line. Based on these determinations, the request for authorization will be declined or accepted. If the request is accepted, an authorization code is issued to merchant 24.

When a request for authorization is accepted, the available credit line of cardholder's 22 account 32 is decreased. Normally, a charge for a payment card transaction is not posted immediately to cardholder's 22 account 32 because bankcard associations, such as MasterCard International Incorporated®, have promulgated rules that do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns goods after the transaction has been captured, a "credit" is generated. Interchange network 28 and/or issuer bank 30 stores the transaction card information, such as a type of merchant, amount of purchase, date of purchase, in a database 120 (shown in FIG. 2).

After a purchase has been made, a clearing process occurs to transfer additional transaction data related to the purchase among the parties to the transaction, such as merchant bank 26, interchange network 28, and issuer bank 30. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction. In the example embodiment, when cardholder 22 purchases travel, such as airfare, a hotel stay, and/or a rental car, at least partial itinerary information is transmitted during the clearance process as transaction data. When interchange network 28 receives the itinerary information, interchange network 28 routes the itinerary information to database 120.

After a transaction is authorized and cleared, the transaction is settled among merchant 24, merchant bank 26, and issuer bank 30. Settlement refers to the transfer of financial data or funds among merchant's 24 account, merchant bank 26, and issuer bank 30 related to the transaction. Usually, transactions are captured and accumulated into a "batch," which is settled as a group. More specifically, a transaction is typically settled between issuer bank 30 and interchange network 28, and then between interchange network 28 and merchant bank 26, and then between merchant bank 26 and merchant 24.

As described below in more detail, a user authentication system may be used to authenticate a user accessing the suite of applications that includes or manages financial information such as payment card transactions. Access to the transactional information described above may be regulated based on the user authentication systems and methods described herein. Although the systems described herein are not intended to be limited to managing such applications, the systems are described as such for exemplary purposes.

Figure 2:
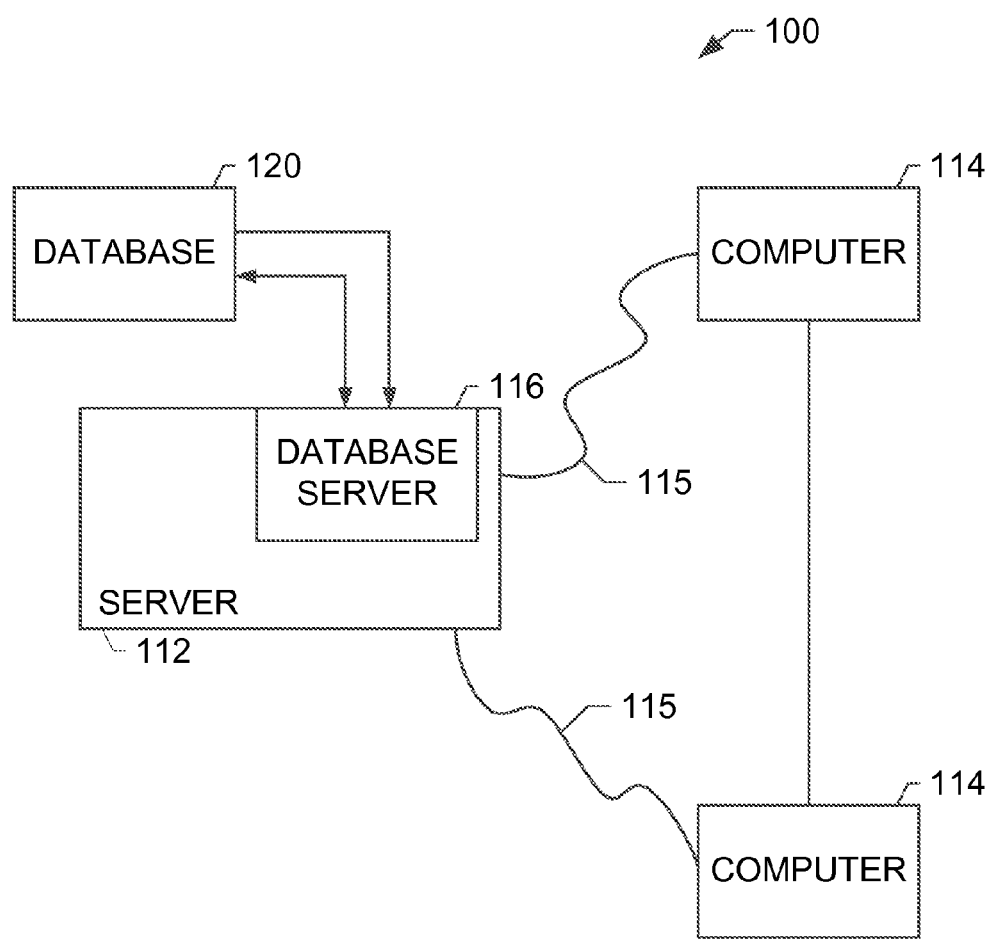

FIG. 2 is a simplified block diagram of an example user authentication system 100 including a plurality of computer devices connected in communication in accordance with the present disclosure. In the example embodiment, system 100 is used for hosting internet-accessible applications, and user authentication of the application's users using the user authentication model as described herein. In other embodiments, the applications may reside on other computing devices (not shown) communicatively coupled to system 100, and may perform user authentication using system 100.

More specifically, in the example embodiment, system 100 includes a user authentication server 112, and a plurality of client sub-systems, also referred to as client systems 114, connected to user authentication server 112. In one embodiment, client systems 114 are computers including a web browser, such that user authentication server 112 is accessible to client systems 114 using the Internet. Client systems 114 are interconnected to the Internet through many interfaces including a network 115, such as a local area network (LAN) or a wide area network (WAN), dial-in-connections, cable modems, special high-speed Integrated Services Digital Network (ISDN) lines, and RDT networks. Client systems 114 could be any device capable of interconnecting to the Internet including a web-based phone, PDA, or other web-based connectable equipment.

A database server 116 is connected to database 120, which contains information on a variety of matters, as described below in greater detail. In one embodiment, centralized database 120 is stored on user authentication server 112 and can be accessed by potential users at one of client systems 114 by logging onto user authentication server 112 through one of client systems 114. In an alternative embodiment, database 120 is stored remotely from user authentication server 112 and may be non-centralized.

Database 120 may include a single database having separated sections or partitions, or may include multiple databases, each being separate from each other. Database 120 may store transaction data generated over the processing network including data relating to merchants, account holders, prospective customers, issuers, acquirers, and/or purchases made. Database 120 may also store account data including at least one of a cardholder name, a cardholder address, an account number, other account identifiers, and transaction information. Database 120 may also store merchant data including a merchant identifier that identifies each merchant registered to use the network, and instructions for settling transactions including merchant bank account information. Database 120 may also store purchase data associated with items being purchased by a cardholder from a merchant, and authorization request data.

In the example embodiment, one of client systems 114 may be associated with acquirer bank 26 (shown in FIG. 1) while another one of client systems 114 may be associated with issuer bank 30 (shown in FIG. 1). User authentication server 112 may be associated with interchange network 28. In the example embodiment, user authentication server 112 is associated with a network interchange, such as interchange network 28, and may be referred to as an interchange computer system. User authentication server 112 may be used for processing transaction data. In addition, client systems 114 may include a computer system associated with at least one of an online bank, a bill payment outsourcer, an acquirer bank, an acquirer processor, an issuer bank associated with a transaction card, an issuer processor, a remote payment system, customers and/or billers.

Figure 3:
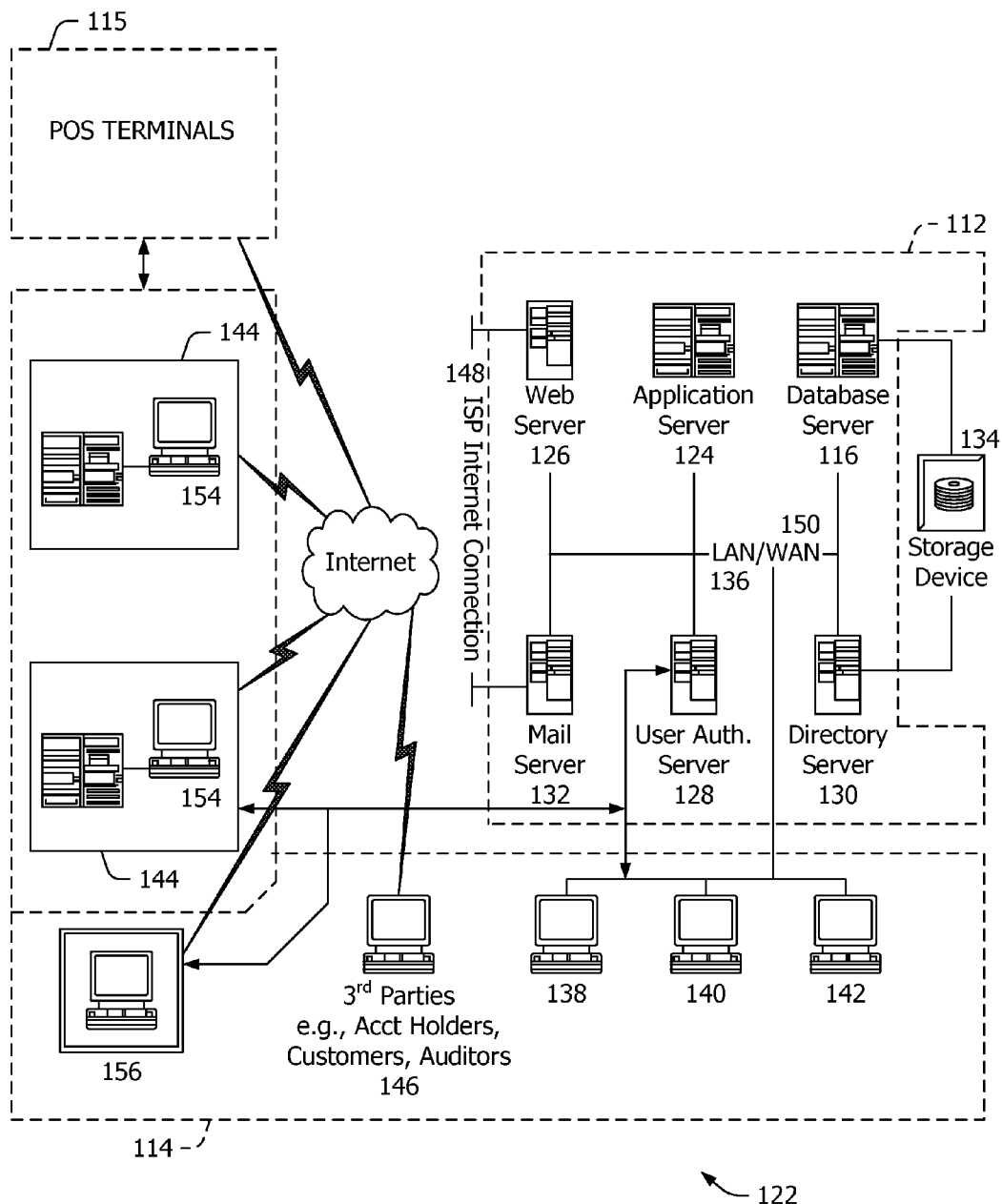

FIG. 3 is an expanded block diagram of an example embodiment of a user authentication server system architecture of a processing system 122 including other computer devices in accordance with one embodiment of the present disclosure. Components in system 122, identical to components of system 100 (shown in FIG. 2), are identified in FIG. 3 using the same reference numerals as used in FIG. 2. System 122 includes user authentication server 112, client systems 114, and POS terminals 118. User authentication server 112 further includes database server 116, a transaction server 124, a web server 126, a user authentication server 128, a directory server 130, and a mail server 132. A storage device 134 is coupled to database server 116 and directory server 130. Servers 116, 124, 126, 128, 130, and 132 are coupled in a local area network (LAN) 136. In addition, an issuer bank workstation 138, an acquirer bank workstation 140, and a third party processor workstation 142 may be coupled to LAN 136. In the example embodiment, issuer bank workstation 138, acquirer bank workstation 140, and third party processor workstation 142 are coupled to LAN 136 using network connection 115. Workstations 138, 140, and 142 are coupled to LAN 136 using an Internet link or are connected through an Intranet.

Each workstation 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

User authentication server 112 is configured to be communicatively coupled to various individuals, including employees 144 and to third parties, e.g., account holders, customers, auditors, developers, consumers, merchants, acquirers, issuers, etc., 146 using an ISP Internet connection 148. The communication in the example embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the example embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with user authentication server 112.

Also, in the example embodiment, web server 126, application server 124, database server 116, and/or directory server 130 may host web applications, and may run on multiple server systems 112. The term "suite of applications," as used herein, refers generally to these various web applications running on server systems 112.

Furthermore, user authentication server 128 is configured, in the example embodiment, to provide user authentication services for the suite of applications hosted by web server 126, application server 124, database server 116, and/or directory server 130. User authentication server 128 may communicate with remotely located client systems, including a client system 156. User authentication server 128 may be configured to communicate with other client systems 138, 140, and 142 as well.

Figure 4:
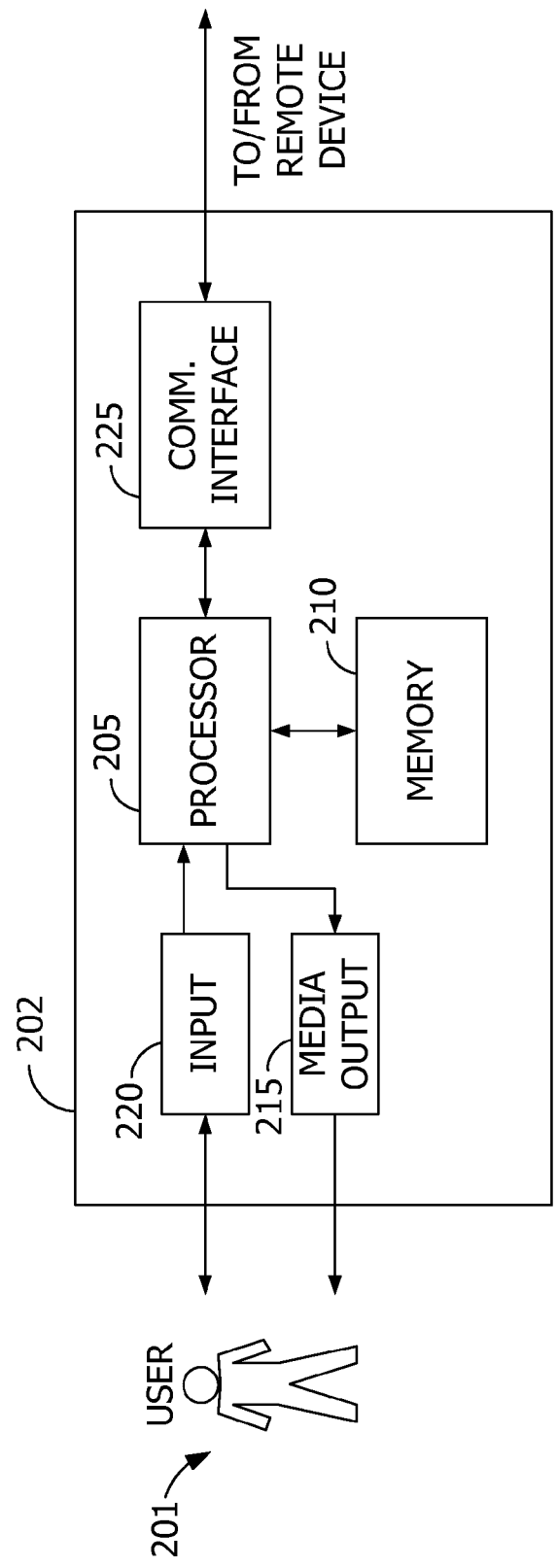

FIG. 4 illustrates an example configuration of a user system 202 operated by a user 201, such as cardholder 22 (shown in FIG. 1). User system 202 may include, but is not limited to, client systems 114, 138, 140, and 142, POS terminal 118, workstation 154, and manager workstation 156. In the example embodiment, user system 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or written works to be stored and retrieved. Memory area 210 may include one or more computer readable media.

User system 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device, a liquid crystal display (LCD), organic light emitting diode (OLED) display, or "electronic ink" display, or an audio output device, a speaker or headphones.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively couplable to a remote device such as user authentication server 112. Communication interface 225 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from user authentication server 112. A client application allows user 201 to interact with a server application from user authentication server 112.

In operation, in the example embodiment, user 201, such as cardholder 22 (shown in FIG. 1), uses user system 202 to interact with the suite of web applications hosted by server systems 112 (shown in FIG. 3) using a web browser. User 201 is authenticated by the suite of applications using user authentication server 128.

Figure 5:
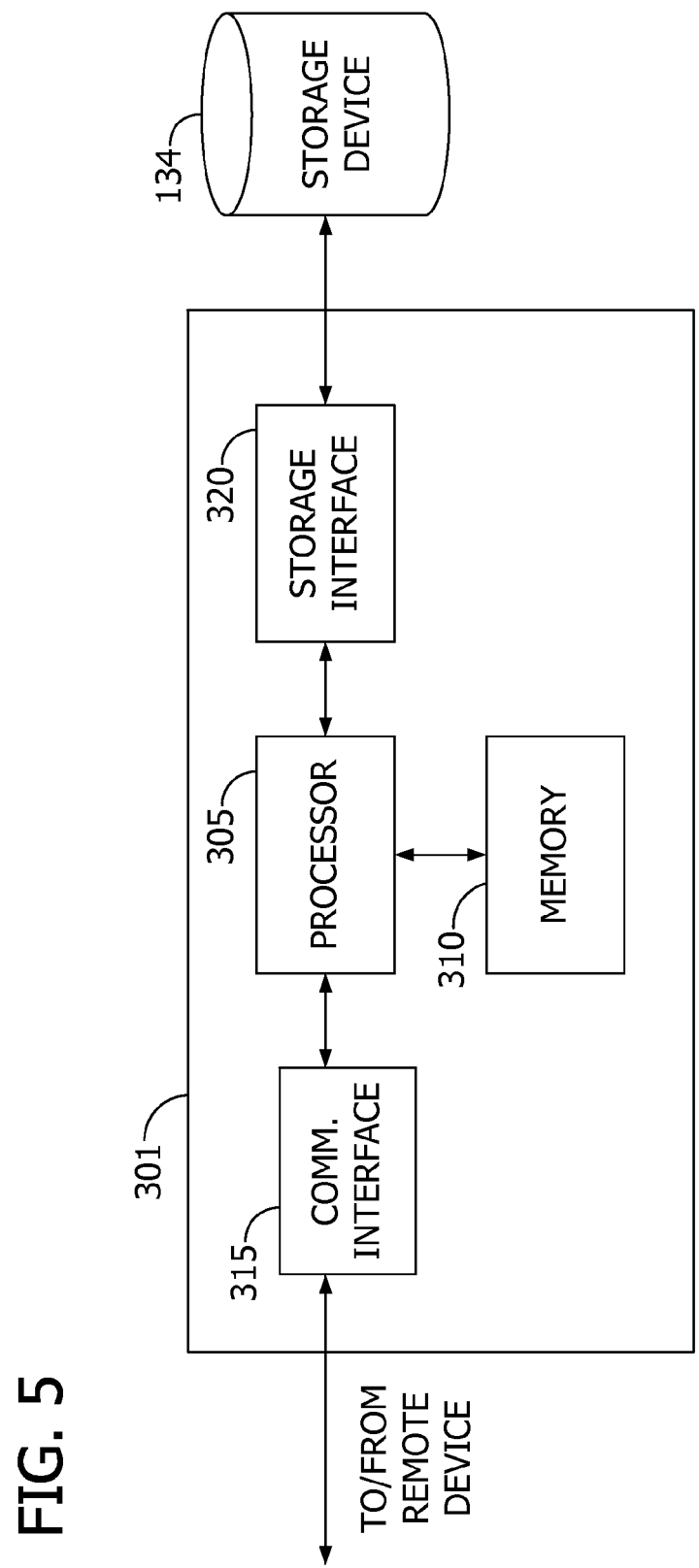

FIG. 5 illustrates an example configuration of a server system 301 such as user authentication server 112 (shown in FIGS. 2 and 3). Server system 301 may include, but is not limited to, database server 116, transaction server 124, web server 126, user authentication server 128, directory server 130, and mail server 132. In the example embodiment, server system 301 performs user authentication associated with the suite of applications, and may also host one or more of those applications.

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 is operatively coupled to a communication interface 315 such that server system 301 is capable of communicating with a remote device such as a user system or another server system 301. For example, communication interface 315 may receive requests from user system 114 via the Internet, as illustrated in FIGS. 2 and 3.

Processor 305 may also be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

In operation, user authentication server 128 (shown in FIG. 1) runs on server system 301, which may also run one or more applications of the suite of applications. User 201 (shown in FIG. 4) interacts with server system 301, and processes such as the suite of applications and/or user authentication server, using user system 202 (shown in FIG. 1).

Figure 6:
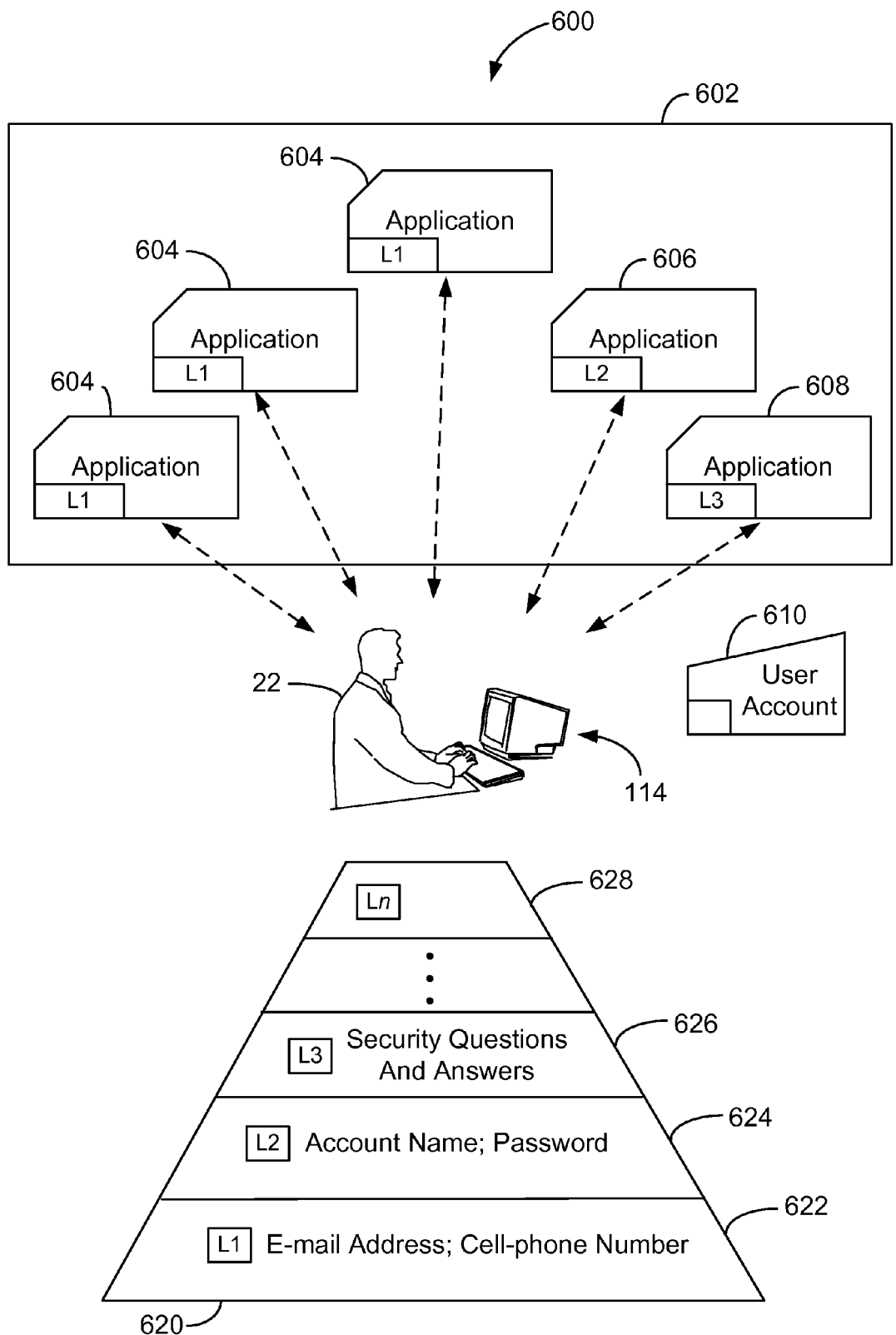

FIG. 6 is a schematic diagram 600 of an example suite of applications 602 implementing a three-tiered user authentication model 620 using the computing systems shown in FIGS. 2-5. A user, such as cardholder 22, accesses suite of applications 602 using computing device 114. In some embodiments, the user is using a web browser running on computing device 114, and connecting to suite of applications 602 through the Internet. Suite of applications 602 includes first-tier applications 604, second-tier applications 606, and third-tier applications 608, indicated in FIG. 6 as "L1", "L2", and "L3", respectively. In some embodiments, suite of applications 602 is a single application within which are various modules, or functions, represented by first-tier applications 604, second-tier applications 606, and third-tier applications 608. In other words, each application 604, 606, and 608, may be a sub-application, or module, of a larger application, and may have a security level defined at the module layer rather than, or in addition to, at the application layer.

In the example embodiment, user account 610 identifies an individual user to suite of applications 602 during operation. In some embodiments, user account 610 includes information uniquely identifying the user from other users of suite of applications 602. Further, in some embodiments, user authentication server 128 (shown in FIG. 3) facilitates storing information associated with user account 610, as well as authenticating users during user interaction with suite of applications 602. The amount and type of information requested and retained for each particular user account 610 is based at least in part on the security level associated with the account, as defined by user authentication model 620.

The example three-tiered user authentication model 620 includes a first-tier security level 622, a second-tier security level 624, and a third-tier security level 626. First-tier security level 622 requests identifying information from a user, such as, for example, an e-mail address or a cellphone number. Second-tier security level 624 requests further identifying information, such as, for example, an account name and password from the user. Third-tier security level 626 requests still further identifying information, such as, for example, security questions and answers, or security tokens. In some embodiments, user authentication model 620 may implement an "n-tiered" approach, in which up to "n" security levels are implemented. For example, the nth-tier security level 628 may require further authentication information. In operation, the tier security level of a user account is compared to the tier security level of an application being accessed, as described in greater detail below.

As described herein, the various "tiers" of user authentication model 620 apply to both applications and/or modules within suite of applications 602, as well as user accounts 610. So, for example, when an application in suite of applications 602 is described herein as a second-tier application 606, this implies an application that has been configured as having the second-tier security level 624, i.e., "L2" as shown in FIG. 6. And likewise, for example, when a user account such as user account 610 is described herein as a first-tier user account, this implies that the user account has been configured as having the first-tier security level 622, i.e., "L1" as shown in FIG. 6. Comparison of a user account's particular security level to the security level of particular applications is described in greater detail below.

Also, in some embodiments, providing identifying information also includes presenting a challenge-response authentication request, such as CAPTCHA (Completely Automated Public Turing test to tell Computers and Humans Apart), and receiving a successful response. It should be understood that the number of security tiers, and the particular user authentication information collected at each tier are examples only, and are not intended to limit this disclosure in any way. Other embodiments are possible, and within the scope of this disclosure.

In some embodiments, a user may skip levels of security. For example, when a first-tier security level 622 user account 610 attempts to access a third-tier application 608, the user 22 may be prompted only for the third-tier security level 626 authentication information, and thus be promoted directly to "L3". In other embodiments, the user 22 may be prompted for some or all of the authentication information associated with intervening security levels. In this embodiment, in the same example as above, the user 22 may be required to provide both the authentication information associated with second-tier security level 624, as well as the authentication information associated with third-tier security level 626.

In some embodiments, applications in suite of applications 602 may be restricted by their defined tier security level as to what authentication information they may request from a user. For example, in one embodiment, first-tier application 604 may be restricted to only requesting, at a maximum, the authentication information associated with first-tier security level 622, i.e., e-mail address and/or cell-phone number. As such, first-tier application 604 may not request of user 22 to enter, for example, an account name, which is a second-tier security level 624 element of authentication information. In another embodiment, first-tier application 604 may be restricted from requesting any authentication information expressly defined in a higher-tier security level. As such, first-tier application 604 may request, for example, date of birth (an element of information not required by any tier of the example user authentication model 620. However, first-tier application 604 may not request, for example, a security question and answer, which is defined by a higher-tier security level, namely third-tier security level 626 in the example.

During operation, each application operating within the described user authentication system (i.e., within suite of applications 602) will be assigned to one of the security levels of user authentication model 620. In some embodiments, the application's defined security level may be based on application content, such as the type of information accessible through the application. For example, an application that requires user identification but that does not provide any personal information about the user may be defined as a first-tier security application. An e-mail address or a cell-phone number may be enough to uniquely identify a person, but is less-private information to which others may have access (i.e., other friends and acquaintances of the user know the user's email address). As another example, for applications that provide or track information personal to the user, greater security and authentication may suggest defining the application as a second-tier security application. Asking the user to create an account name and password provides an authentication method that the user can keep private. As still another example, for applications that provide even greater exposure to personal information, such as credit card numbers, still further security and authentication may suggest defining the application as a third-tier security application.

Asking the user to provide security questions and answers, or enter a security token, may add an extra layer of security to the more sensitive data.

A new user of suite of applications 602, such as cardholder 22, creates a new user account, such as user account 610. In some embodiments, user account 610 is initially configured as having first-tier security level 622. User authentication server 128 requests and stores identifying information associated with first-tier security level 622, such as an email address. While the user accesses first-tier applications 604, the user authenticates using his first-tier user account 610 without having to provide any further information. Upon accessing a second-tier application 606, user authentication server 128 recognizes that user account 610 is currently only permissioned as first-tier security level 622. The user is then prompted to enter additional information consistent with a second-tier security level 624, such as an account name and password. Once the user has entered the requisite information, user account 610 is promoted to second-tier security level 624. If the user account is not properly promoted to an adequate security level, i.e., at least as high of a security level as the application the user is trying to access, then the user account will be prohibited from accessing and/or executing the application. After promotion, while the user accesses first-tier applications 604 and second-tier applications 606, the user's now-second-tier user account 610 allows the user access without having to provide any further information. But upon accessing a third-tier application 608, the user will likewise be prompted to enter additional information consistent with a third-tier security level 626, such as security questions and answers.

Figure 7:
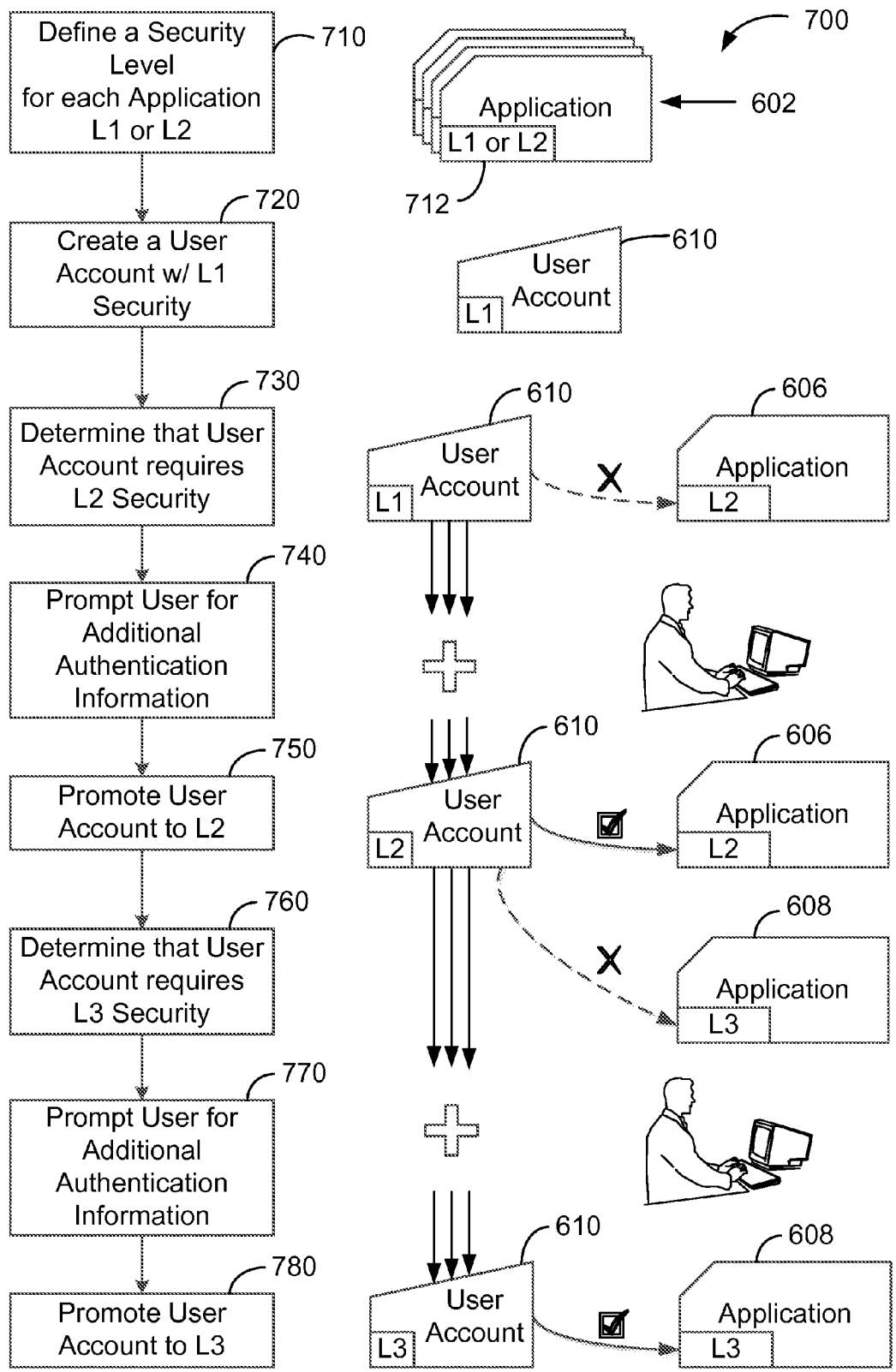

FIG. 7 is an example method 700 of implementing a tiered user authentication model similar to that shown in FIG. 6. A security level 712 is defined 710 for each application in suite of applications 602. Security level 712, in some embodiments, is one of at least first-tier security level 622, "L1", and second-tier security level 624, "L2", as shown in FIG. 6. A user account 610 is created 720 as a first-tier security level, "L1". It is then determined 730 that user account 610 requires second-tier security, for example, user account 610 requesting access to second-tier application 606. Such determination 730 is made by comparing the security level of user account 610 to the security level of the particular application to be accessed. A user account that has a lower-tier security level than the application being accessed is considered in need of promotion, and thus requires prompting for additional authentication information. The user is prompted 740 for additional authentication information, for example, an account name and password. Once the user has provided the additional authentication information, user account 610 is promoted 750 to a second-tier security level, "L2", and thereby has access to the second-tier application 606.

Similarly, in the example embodiment, user account 610 attempts to access a third-tier application 608. It is determined 760 that user account 610, currently configured as second-tier security level 624, i.e., "L2", requires third-tier security level 626 (shown in FIG. 6), i.e., "L3". The user is prompted 770 for additional authentication information, for example, security questions and answers. Once the user has appropriately complied, user account 610 is promoted 780 to the third-tier security level, i.e., "L3", and thereby has access to third-tier application 608.

Figure 8:
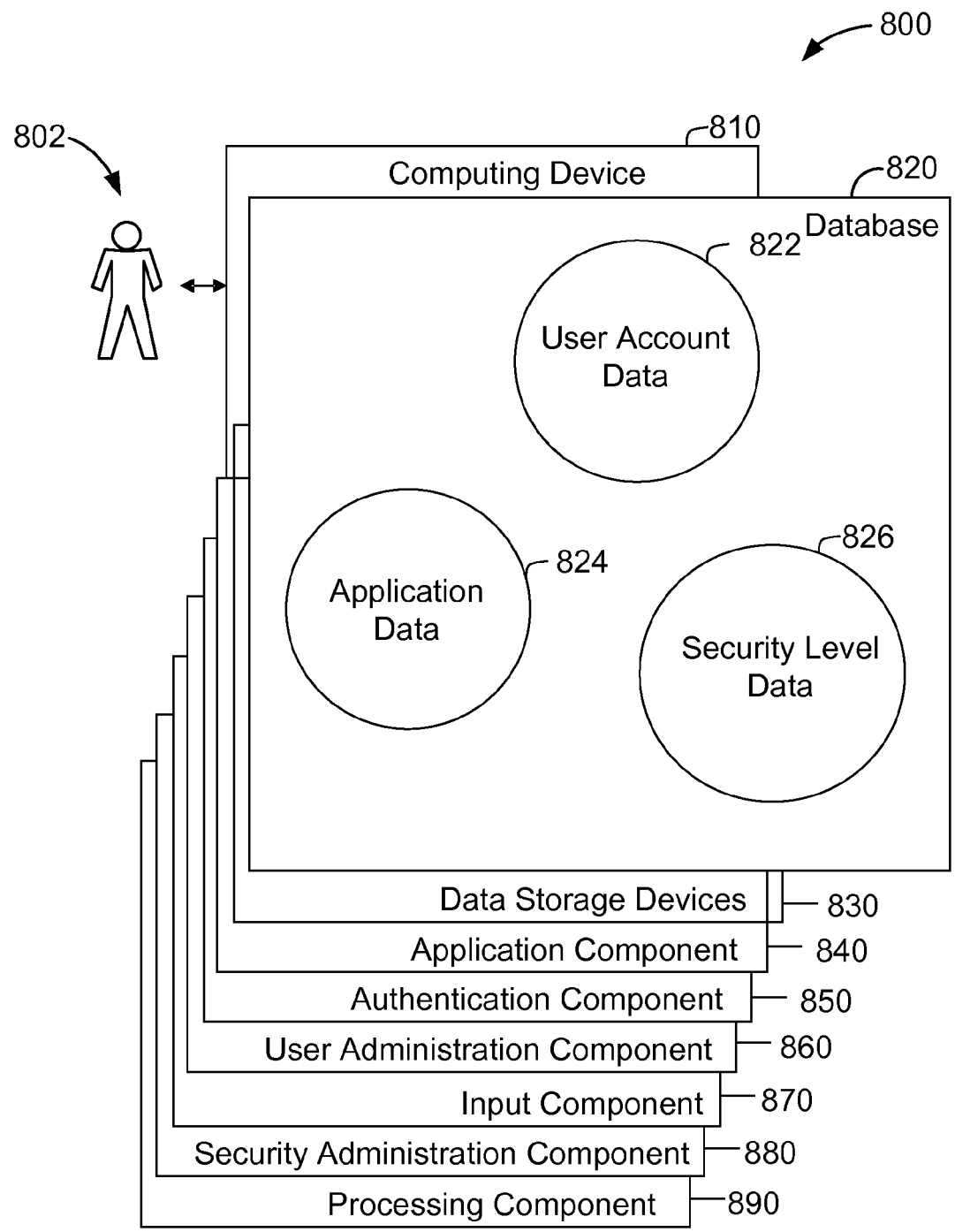

FIG. 8 shows an example configuration 800 of a database 820 within a computing device 810, along with other related computing components, that may be used during user authentication. Database 820 is coupled to several separate components within computing device 810, which perform specific tasks.

In the example embodiment, database 820 includes user account data 822, application data 824, and security level data 826. User account data 822 includes information on user accounts 10 (shown in FIG. 6), such as, for example, authentication information of the user, identifying information about the user account, and the current security level of the user account. Application data 824 includes information on the suite of applications 602 (shown in FIG. 6), such as the security level of the application or module. Security level data 826 includes configuration information on each security level of user authentication model 620 (shown in FIG. 6), such as what data is required for a given level.

Computing device 810 includes the database 820, as well as data storage devices 830. Computing device 810 also includes an authentication component 850 for authenticating user access requests using the information in database 820. Computing device 810 also includes an application component 840 for executing applications that authenticate users with authentication component 850 (i.e., suite of applications 602). A user administration component 860 is also included for creating and administering user account information, as well as an input component 870 for receiving input from a user 802. A security administration component 880 is included for changing security settings within the user authentication system. A processing component 890 assists with execution of computer-executable instructions associated with the user authentication system.

As will be appreciated based on the foregoing specification, the above-described embodiments of the disclosure may be implemented using computer programming or engineering techniques including computer software, firmware, hardware or any combination or subset thereof, wherein the technical effect is defining a security level of an application, creating a user account having a security level, determining that the user account requires a higher security level, prompting the user for additional authentication information, and promoting the user account to the higher security level. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments of methods and systems of graduated security for user authentication provide a unified security system for a suite of customer-facing applications. As a result, the methods and systems described herein facilitate reducing information requests to potentially-unwilling users and centralizing authentication requests and security information for users of the suite of applications.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer system for requesting personal information from a user for authenticating access to at least one computer application of a plurality of computer applications, said computer system comprising a memory device and a processor, said computer system programmed to:
  identify a security level from a plurality of security levels for each computer application within the plurality of computer applications, wherein the plurality of security levels include at least a first-tier security level and a second-tier security level, wherein the second-tier security level requires the user to enter additional personal information as compared to the first-tier security level, wherein a first computer application within the plurality of computer applications is configured to require the first-tier security level;
  create a user account for the user within the memory device, wherein creating the user account includes configuring the user account with the first-tier security level by prompting the user to provide first personal information associated with the user, wherein the first personal information is previously unknown to the computer system;
  restrict the first computer application from requiring a password to enable access to the first computer application;
  receive a user input from the user to access a second computer application that is configured to require the second-tier security level to enable access thereto;
  determine that the user account has not been granted the second-tier security level;
  prompt the user to enter the additional personal information associated with the user that is previously unknown to the computer system; and
  promote the user account to the second-tier security level, including associating the additional personal information with the user account.

2. The computer system in accordance with claim 1, wherein the plurality of computer applications comprise a first computer application having multiple modules, wherein each module is assigned at least one of the first-tier security level and the second-tier security level.

3. The computer system in accordance with claim 1, wherein the plurality of security levels further includes a third-tier security level, wherein the third-tier security level requires further personal information as compared to the second-tier security level.

4. The computer system in accordance with claim 3, wherein the computer system is further programmed to:
  prohibit execution of the second application by the user account if the user account is configured as having the first-tier security level; and
  prohibit execution of a third application by the user account if the user account is configured as having one of the first-tier security level and the second-tier security level, wherein the third application is configured as requiring a third-tier security level.

5. The computer system in accordance with claim 1, wherein the additional personal information includes at least an account name and a password.

6. The computer system in accordance with claim 1, wherein the computer system is further programmed to determine that the user account requires the second-tier security level based at least in part on the user account interacting with the second application.

7. The computer system in accordance with claim 1, wherein the computer system is further programmed to:
  restrict the second application from storing account number information.

8. The computer system in accordance with claim 1, wherein the computing system is further programmed to prompt the user using CAPTCHA prior to promoting the user account to the second-tier security level.

9. A computer-implemented method for requesting personal information from a user for authenticating access to at least one computer application of a plurality of computer applications using a computer device in communication with the plurality of computer applications, the method comprising:
  defining a security level from a plurality of security levels for each computer application of the plurality of computer applications, wherein the plurality of security levels include at least a first-tier security level and a second-tier security level, wherein the second-tier security level requires the user to enter additional personal information as compared to the first-tier security level, wherein a first computer application within the plurality of computer applications is configured to require the first-tier security level;
  creating a user account for the user within the authentication tool, wherein creating the user account includes configuring the user account as the first-tier security level by prompting the user to provide first personal information associated with the user, wherein the first personal information is previously unknown to the computer system;
  restricting the first computer application from requiring a password to enable access to the first computer application;
  receiving a user input from the user to access a second computer application that is configured to require the second-tier security level to enable access thereto;
  determining that the user account has not been granted the second-tier security level;
  prompting the user to enter the additional personal information associated with the user that is previously unknown to the computer system; and
  promoting the user account to the second-tier security level, including associating the additional personal information with the user account.

10. The method in accordance with claim 9, wherein defining a security level comprises defining a security level for each module of a plurality of modules, wherein the plurality of modules comprise a first computer application of the plurality of computer applications.

11. The method in accordance with claim 9, wherein defining a security level comprises defining a security level from a plurality of security levels further including a third-tier security level, wherein the third-tier security level requires additional personal information as compared to the second-tier security level.

12. A method in accordance with claim 11, further comprising:
  prohibiting execution of the second application by the user account if the user account is configured as having the first-tier security level; and prohibiting execution of a third application by the user account if the user account is configured as having one of the first-tier security level and the second-tier security level, wherein the third application is configured as requiring the third-tier security level.

13. A method in accordance with claim 9, wherein prompting the user comprises prompting the user for at least an account name and a password.

14. The method in accordance with claim 9, wherein determining that a user account requires second-tier security level comprises determining based at least in part on the user account interacting with the second application.

15. A method in accordance with claim 9, further comprising:
restricting the second application from storing account number information.

16. A method in accordance with claim 9, wherein promoting the user account to a second tier security level includes prompting the user using CAPTCHA prior to promoting the user account to the second-tier security level.

17. At least one non-transitory computer-readable storage media having computer-executable instructions embodied thereon, wherein when executed by at least one processor, the computer-executable instructions cause the processor to:
identify a security level from a plurality of security levels for each computer application within a plurality of computer applications, wherein the plurality of security levels include at least a first-tier security level and a second-tier security level, wherein second-tier security level requires a user to enter additional personal information as compared to the first-tier security level, wherein a first computer application within the plurality of computer applications is configured to require the first-tier security level;
create a user account for the user within a memory device communicatively coupled with the processor, wherein creating the user account includes configuring the user account as the first-tier security level by prompting the user to provide first personal information associated with the user, wherein the first personal information is previously unknown to the computer system;
restrict the first computer application from requiring a password to enable access to the first computer application;
receive a user input to access a second computer application that is configured to require the second-tier security level;
determine that the user account has not been granted the second-tier security level;
prompt the user to enter the additional personal information associated with the user that is previously unknown to the computer system; and
promote the user account to the second-tier security level, including associating the additional personal information with the user account.

18. The computer-readable storage media of claim 17, wherein the plurality of computer applications comprise a first computer application having multiple modules, wherein each module is assigned at least one of the first-tier security level and the second-tier security level.

19. The computer-readable storage media of claim 17, wherein the plurality of security levels further includes a third-tier security level, wherein the third-tier security level requires further personal information as compared to the second-tier security level.

20. The computer-readable storage media of claim 19, wherein the computer-executable instructions further cause the processor to:
prohibit execution of the second application by the user account if the user account is configured as having the first-tier security level; and
prohibit execution of a third application by the user account if the user account is configured as having one of the first-tier security level and the second-tier security level, wherein the third application is configured as requiring the third-tier security level.

21. The computer-readable storage media of claim 17, wherein the computer-executable instructions further cause the processor to determine that the user account requires second-tier security level based at least in part on the user account interacting with a first application of the plurality of applications requiring the second-tier security level.

22. A computer system for requesting personal information from a user for authenticating access to a computer application including a plurality of modules, said computer system comprising a memory device and a processor, said computer system programmed to:
identify a security level from a plurality of security levels for one or more modules of the plurality of modules, wherein the plurality of security levels include at least a first-tier security level and a second-tier security level, wherein the second-tier security level requires the user to enter additional personal information as compared to the first-tier security level, wherein a first module within the plurality of modules is configured to require the first-tier security level;
create a user account for the user within the memory device, wherein creating the user account includes configuring the user account with the first-tier security level by prompting the user to provide first personal information associated with the user, wherein the first personal information is previously unknown to the computer system;
restrict the first module from requiring a password to enable access to the first module;
receive a user input from the user to access a second module that is configured to require the second-tier security level to enable access thereto;
determine that the user account has not been granted the second-tier security level;
prompt the user to enter the additional personal information associated with the user that is previously unknown to the computer system; and
promote the user account to the second-tier security level, including associating the additional personal information with the user account.

23. The computer system in accordance with claim 22, wherein the security level further includes a third-tier security level, wherein the third-tier security level requires further personal information as compared to the second-tier security level.

24. The computer system in accordance with claim 23, wherein the computer system is further programmed to:
prohibit execution of the second module within the plurality of modules by the user account if the user account is configured as having the first-tier security level; and
prohibit execution of a third module within the plurality of modules by the user account if the user account is configured as having one of the first-tier security level and the second-tier security level, wherein the third module is configured as requiring a third-tier security level.

25. The computer system in accordance with claim 22, wherein the additional personal information includes at least an account name and a password.

26. The computer system in accordance with claim 22, wherein the computer system is further programmed to determine that the user account requires the second-tier security level based at least in part on the user account interacting with the second module.

27. The computer system in accordance with claim 22, wherein the computer system is further programmed to:
   restrict the second module from storing account number information.

* * * * *